(12) United States Patent
Weintraub et al.

(10) Patent No.: US 8,774,622 B2
(45) Date of Patent: Jul. 8, 2014

(54) AIRFIELD LIGHTING CONTROL AND MONITORING SYSTEM UTILIZING FIBER OPTIC DOUBLE LOOP SELF HEALING COMMUNICATIONS

(75) Inventors: Andrei Weintraub, Holon (IL); Maoz Ohad, West Hartford, CT (US)

(73) Assignee: Cooper Technology Company, Houston, TX (US)

( * ) Notice: Subject to any disclaimer, the term of this patent is extended or adjusted under 35 U.S.C. 154(b) by 479 days.

(21) Appl. No.: 13/270,843

(22) Filed: Oct. 11, 2011

(65) Prior Publication Data

US 2012/0189298 A1 Jul. 26, 2012

Related U.S. Application Data

(60) Provisional application No. 61/435,074, filed on Jan. 21, 2011.

(51) Int. Cl.
*H04B 10/08* (2006.01)

(52) U.S. Cl.
USPC ............. 398/9; 398/33; 398/57; 398/141; 340/982

(58) Field of Classification Search
CPC .... H05B 37/00; H05B 37/02; H05B 37/0245; H05B 37/0254; H05B 37/263; B64F 1/18; B64F 1/20; H04B 10/12; H04B 10/25; H04B 17/00; H04B 2203/00
USPC ............. 398/9, 33, 57, 59, 66, 115, 116, 141; 315/294; 340/945, 947, 953, 982
See application file for complete search history.

(56) References Cited

U.S. PATENT DOCUMENTS

| 4,190,821 | A | 2/1980 | Woodward | |
|---|---|---|---|---|
| 5,243,340 | A | 9/1993 | Norman et al. | |
| 5,359,325 | A | 10/1994 | Ford et al. | |
| 5,485,151 | A | 1/1996 | Runyon et al. | |
| 5,969,642 | A * | 10/1999 | Runyon et al. | ................ 340/953 |
| 6,489,733 | B1 * | 12/2002 | Schmidt et al. | ................ 315/312 |
| 6,573,840 | B1 * | 6/2003 | Norman et al. | ................ 340/953 |
| 8,629,626 | B2 * | 1/2014 | Glassner | ........................ 315/291 |
| 2005/0190078 | A1 * | 9/2005 | Salter | ............................. 340/945 |
| 2008/0001782 | A1 | 1/2008 | That | |
| 2009/0201190 | A1 | 8/2009 | Huthoefer et al. | |
| 2011/0187291 | A1 * | 8/2011 | Plischke | ........................ 315/312 |

* cited by examiner

*Primary Examiner* — M. R. Sedighian
(74) *Attorney, Agent, or Firm* — King & Spalding LLP (57) ABSTRACT

Control and monitoring of airfield lighting from a control tower and other maintenance/supervisory locations uses double loop self healing fiber optic communications circuits to enhances speed of operation even with large and complex airfield lighting system requirements, and significantly increased reliability and operating lifetime thereof. A plurality of local light control and monitoring groups are used, wherein each group has at least one fiber optic communications concentrator that independently communicates with light controllers within the group and the remote supervisory control and monitoring systems in the control tower and other locations. This allows faster control response of the lamps in each of the airfield light fixtures, and monitoring concentration of operational data within each group. Each of the at least one fiber optic concentrators is optically coupled to double loop self healing fiber optic communications backbone circuits coupled to main and backup computer supervisory control systems for redundancy purposes.

17 Claims, 5 Drawing Sheets

AIRFIELD LIGHTING CONTROL AND MONITORING SYSTEM UTILIZING FIBER OPTIC DOUBLE LOOP SELF HEALING COMMUNICATIONS

RELATED PATENT APPLICATION

This application claims priority to commonly owned U.S. Provisional Patent Application Ser. No. 61/435,074; filed Jan. 21, 2011; entitled "Airfield Lighting Control and Monitoring System Utilizing Parallel Fiber Optic Communication," by Maoz Ohad and Andrei Weintraub; and is hereby incorporated by reference herein for all purposes.

TECHNICAL FIELD

The present invention relates generally to airfield lighting systems, and more particularly, to an airfield lighting control and monitoring system utilizing fiber optic double loop self healing communications.

BACKGROUND

The control of aircraft on the ground is a very complicated and high stakes task. Airfields must often provide control and guidance to aircraft while taxiing or standing both before takeoff and after landing. Safety and reliability are at a premium in the field of aircraft control on the ground. For this purpose, airfield lighting control systems have been developed to prevent incursions onto an active runway or taxiway, thereby reducing the possibility of collisions between aircraft, especially during conditions of low visibility.

Existing airport runways typically include a series of runway light fixtures secured along the centerline (embedded in the runway) and/or sidelines (embedded or raised) of an airport runway. Each light fixture includes one or more light sources, e.g., incandescent, fluorescent and/or light emitting diode (LED) lamps, which provide illumination and positional guidance to aircraft on the airport runway. Each light fixture includes one or more lamps that provide illumination and guidance to the aircraft. The runway light fixtures are powered by means of series connected isolating current transformers fed from a constant current regulator circuit located in an electrical vault near or beneath the runway. The constant current regulator typically is set at a current value that is selectable in steps from about 2.8 to 6.6 amperes RMS.

Control and monitoring of the runway lights are performed remotely at the control tower, and also at other maintenance locations. Thereby enabling airport personnel in the control tower to select individually the intensity (off being one intensity of zero) of the light illumination for each runway. In addition, lamps may be controlled to flashed on and off in various patterns.

Remote monitoring of the airfield lighting system is critical for safe operation. If an excessive number of runway lamps malfunction, especially if adjacent runway lamps malfunction, the lighting configuration of the runway may be adversely changed.

To effect remote control and monitoring of the airport lighting from the control tower, and other locations for maintenance and testing purposes, remote control and monitoring devices must be used in combination with the lighting fixtures, one control circuit for each lamp to be controlled, and enough monitoring points to insure that the runway lighting system is operating sufficiently to safely guide and control movements of aircraft on the runway(s). Typically, these control circuits are located close to or within each associated runway light fixture. Since electrical power conductors must be used to supply power to each runway light fixture, a popular and effective way to send control signals to and receive monitoring/status signals from each runway light fixture has been to impress power line carrier signals upon these electrical power conductors.

Using power line carrier control and monitoring has significant advantages as substantially less wire has to be run throughout the runway(s), and power line carrier signaling equipment is a mature technology that is relatively inexpensive to implement with today's electronic components. However, power line carrier signaling equipment suffers from some very basic and difficult to solve weaknesses (e.g., vulnerabilities) in systems operations and reliability. Power line carrier control and monitoring communications depends on the quality of the airfield power circuit wiring which is in a constant of degradation and will eventually develop faults. In addition, electrical noise/interference generated by power switching operations, lightning strikes and other man made and natural interference at the power line carrier signal frequencies degrades the operation/monitoring/speed of the airfield lighting control system. Also, if a power circuit is broken to a group of light fixtures that is used to feed the carrier signals to other groups of light fixtures, major runway lighting outages may occur. Operational speed of a power line carrier signaling system is also limited as the complexity of the runway lighting system increases. Electrical signal noise and interference will also reduce the effective speed of operation of the power line carrier signaling system.

SUMMARY

Therefore, what is needed is a more robust and higher speed of operation for controlling and monitoring airfield lighting systems remotely from a control tower and other maintenance/supervisory locations. Using fiber optic communications to control and monitor operation of airfield light fixtures eliminates the possibility of cross-talk, signal interference, lightning strike interference and power wiring degradation that significantly affects present technology power line carrier signaling systems. In addition, a significant advantage in using fiber optic communications is enhanced speed of operation even with large and complex airfield lighting system requirements, and significantly increased reliability and operating lifetime.

According to the teachings of this disclosure, further communications time improvements and operational reliability are accomplished by separating a large serial fiber optic communications circuit into a plurality of smaller fiber optic communications circuit groups. Each group having at least one fiber optic communications concentrator that independently communicates with fiber optic signal based light fixture controllers within the group and the remote supervisory control and monitoring systems in the control tower and other locations. This allows faster control response of the lamps in each of the airfield light fixtures, and monitoring concentration of operational data within each group for example, but not limited to, exception (fault, malfunction, etc.) reporting in a background mode that does not impact execution of control command speeds.

A further improvement in airfield lighting system operational reliability may be obtained, according to the teachings of this disclosure, by utilizing fiber optic double loop self healing communications. The fiber optic double loop self healing communications may be provided, as more fully described hereinafter, with a plurality of light controllers having fiber optic communications capabilities that are coupled between a main concentrator and a backup concentrator having fiber optic communications capabilities. In addition, the main and backup concentrators may also function as light controllers. It is contemplated and within the scope of this disclosure that the same hardware may be used for both the light controllers and the concentrators, with differentiation made therebetween by software (firmware) programming.

A local light control and monitoring group using fiber optic double loop self healing communications may therefore be characterized as comprising a main concentrator (with or without light controller capabilities), a plurality of light controllers and a backup concentrator (with or without light controller capabilities). The main concentrator, plurality of light controllers and backup concentrator communicate using serial data over light transmissive fiber optic cables. There are two receive and two transmit fiber optic communications ports associated with each one of the main and backup concentrators, and the plurality of light controllers. One of these receive ports is associated with one of the transmit ports, and the other receive port is associated with the other transmit port such that data received on the one receive port is retransmitted on the one transmit port, and data received on the other receive port is retransmitted on the other transmit port. Data associated with a particular concentrator or light controller may be detected (received) from either one or both of the receive ports or inserted (transmitted) into either one or both of the transmit ports associated with that particular concentrator or light controller. Therefore there are two paths for receive data and two paths for transmit data (duplex—simultaneous transmit and receive) for each one of the concentrators and light controllers, the data received at the one receive port is repeated through the one transmit port, and the data received at the other receive port is repeated through the other transmit port.

Data not intended for or from a respective concentrator or light controller is merely passed through (repeated) by the main concentrator, plurality of light controllers and/or backup concentrator over the light transmissive fiber optic communications cables therebetween. One end of a local double loop duplex fiber optic communications circuit is coupled to the one receive and transmit ports of the main concentrator. The other receive and transmit ports of the main concentrator are coupled to the one transmit and receive ports, respectively, of the first one of the plurality of light controllers. The other receive and transmit ports of the first one of the plurality of light controllers are coupled to the one transmit and receive ports, respectively, of the next one of the plurality of light controllers, etc. Finally the other receive and transmit ports of the last one of the plurality of light controllers are coupled to the one transmit and receive ports, respectively, of the backup concentrator. The other receive and transmit ports of the backup concentrator are coupled to the other end of the local double loop duplex fiber optic communications circuit. Whereby any one of the main and backup concentrators and the plurality of light controllers may be accessed (scanned) by a control system coupled into the local double loop duplex fiber optic communications circuit. If some of the plurality of light controllers are only accessible by the main concentrator and the other ones of the plurality of light controllers are only accessible by the backup concentrator, then the control system may still communicate with all of the plurality of light controllers through a respective concentrator (concentrator may also be a light controller) having an operative duplex fiber optic communications circuit therebetween.

For example, if the one end of the local double loop duplex fiber optic communications circuit coupled to the main concentrator becomes inoperative, then the control system may use exclusively the other end the local double loop duplex fiber optic communications circuit coupled to the backup concentrator for communicating with the main concentrator, backup concentrator and/or any one or more of the plurality of light controllers. And visa-versa if the other end of the local double loop duplex fiber optic communications circuit coupled to the backup concentrator becomes inoperative. In addition, a fiber optic communications failure between any one of the plurality of light controllers, or between a main or backup concentrator and a one of the plurality of light controllers may similarly be healed by "going the other way" around the local double loop duplex fiber optic communications circuit and through any intervening concentrator and/or light controllers.

A plurality of local light control and monitoring groups may be implemented as describe herein, wherein each one of the plurality of local light control and monitoring groups may operate independently from the others on their respective local double loop duplex fiber optic communications circuits. Therefore, scanning and control within each one of the local lamp control and monitoring groups may be performed independently of the other, and also done simultaneously (in parallel) for all of these local groups over their respective local double loop duplex fiber optic communications circuits.

The control system is data coupled to each one of the plurality of local lamp control and monitoring groups through a backbone double loop duplex fiber optic communications circuit coupled to a data router that also is coupled to each one of the local double loop duplex fiber optic communications circuits associated with the plurality of local lamp control and monitoring groups. The data router is a fiber optic hub or multiplexer that disseminates data to and from the backbone double loop duplex fiber optic communications circuit and the local double loop duplex fiber optic communications circuits. The data router performs no logic functions and is only hardware that facilitates fiber optic communications between the backbone and local double loop duplex fiber optic communications circuits. Routing logic for addressing data to/from each of the plurality of light controllers may be performed by the main and/or backup concentrators associated with each local group of light controllers.

According to a specific example embodiment of this disclosure, an airfield lighting control and monitoring system comprises: a main computer; a backup computer; a main backbone fiber optic to serial interface, wherein a serial interface portion thereof is coupled to the main computer; a backup backbone fiber optic to serial interface, wherein a serial interface portion thereof is coupled to the backup computer; a fiber optic router having a plurality of fiber optic transmit and receive port pairs; a backbone double loop self healing fiber optic communications circuit having a main backbone fiber optic portion and a backup backbone fiber optic portion, wherein a first end of the main backbone fiber optic portion is coupled to a fiber optic transmit and receive port pair of the main backbone fiber optic to serial interface, a second end of the main backbone fiber optic portion is coupled to one of the plurality of fiber optic transmit and receive port pairs of the fiber optic router, a first end of the backup backbone fiber optic portion is coupled to a fiber optic transmit and receive port pair of the backup backbone fiber optic to serial interface, and a second end of the backup backbone fiber optic portion is coupled to another one of the plurality of fiber optic transmit and receive port pairs of the fiber optic router; a plurality of local light control and monitoring groups, each of the plurality of local light control and monitoring groups comprises: a main concentrator having first and second fiber optic transmit and receive port pairs, a backup concentrator having first and second fiber optic transmit and receive port pairs, a plurality of light controllers having first and second fiber optic transmit and receive port pairs, wherein the plurality of light controllers are fiber optically coupled together, the first one of the plurality of light controllers is fiber optically coupled to the main concentrator, and the last one of the plurality of light controllers is fiber optically coupled to the backup concentrator; and a local double loop self healing fiber optic communications circuit having a main local fiber optic portion and a backup local fiber optic portion, wherein a first end of the main local fiber optic portion is coupled to a fiber optic transmit and receive port pair of the main concentrator, a second end of the main local fiber optic portion is coupled to a respective one of the plurality of fiber optic transmit and receive port pairs of the fiber optic router, a first end of the backup local fiber optic portion is coupled to a fiber optic transmit and receive port pair of the backup concentrator, and a second end of the backup local fiber optic portion is coupled to another respective one of the plurality of fiber optic transmit and receive port pairs of the fiber optic router; wherein the main and backup computers can communicate with any one or more of the plurality of light controllers through the backbone double loop self healing fiber optic communications circuit, the fiber optic router, respective ones of the local double loop self healing fiber optic communications circuits, and respective ones of the main or backup concentrators.

According to another specific example embodiment of this disclosure, a local light control and monitoring group comprises: a main concentrator having first and second fiber optic transmit and receive port pairs, a backup concentrator having first and second fiber optic transmit and receive port pairs, a plurality of light controllers having first and second fiber optic transmit and receive port pairs, wherein the plurality of light controllers are fiber optically coupled together, the first one of the plurality of light controllers is fiber optically coupled to the main concentrator, and the last one of the plurality of light controllers is fiber optically coupled to the backup concentrator; and a local double loop self healing fiber optic communications circuit having a main local fiber optic portion and a backup local fiber optic portion, wherein a first end of the main local fiber optic portion is coupled to a fiber optic transmit and receive port pair of the main concentrator, a second end of the local backbone fiber optic portion is coupled to a fiber optic router, a first end of the backup local fiber optic portion is coupled to a fiber optic transmit and receive port pair of the backup concentrator, and a second end of the backup local fiber optic portion is coupled to the fiber optic router; wherein any one or more of the plurality of light controllers, and main and backup concentrators are accessible from the main or backup local fiber optic portions of the local double loop self healing fiber optic communications circuit.

According to yet another specific example embodiment of this disclosure, a method for control and monitoring of an airfield lighting system comprises the steps of: providing at least one computer having main and backup fiber optic transmit and receive port pairs; providing a fiber optic router having a plurality of fiber optic transmit and receive port pairs; providing a backbone double loop self healing fiber optic communications circuit having a main backbone fiber optic portion and a backup backbone fiber optic portion, wherein the backbone double loop self healing fiber optic communications circuit comprises the steps of: coupling a first end of the main backbone fiber optic portion to a fiber optic transmit and receive port pair of the main backbone fiber optic to serial interface, coupling a second end of the main backbone fiber optic portion to one of the plurality of fiber optic transmit and receive port pairs of the fiber optic router, coupling a first end of the backup backbone fiber optic portion to a fiber optic transmit and receive port pair of the backup backbone fiber optic to serial interface, and coupling a second end of the backup backbone fiber optic portion to another one of the plurality of fiber optic transmit and receive port pairs of the fiber optic router; providing a plurality of local light control and monitoring groups, each of the plurality of local light control and monitoring groups comprises: a main concentrator having first and second fiber optic transmit and receive port pairs, a backup concentrator having first and second fiber optic transmit and receive port pairs, a plurality of light controllers having first and second fiber optic transmit and receive port pairs, wherein the plurality of light controllers are fiber optically coupled together, the first one of the plurality of light controllers is fiber optically coupled to the main concentrator, and the last one of the plurality of light controllers is fiber optically coupled to the backup concentrator; and a local double loop self healing fiber optic communications circuit having a main local fiber optic portion and a backup local fiber optic portion, wherein the local double loop self healing fiber optic communications circuit comprises the steps of: coupling a first end of the main local fiber optic portion to a fiber optic transmit and receive port pair of the main concentrator, coupling a second end of the main local fiber optic portion to a respective one of the plurality of fiber optic transmit and receive port pairs of the fiber optic router, coupling a first end of the backup local fiber optic portion to a fiber optic transmit and receive port pair of the backup concentrator, and coupling a second end of the backup local fiber optic portion to another respective one of the plurality of fiber optic transmit and receive port pairs of the fiber optic router; and communicating with the at least one computer to any one or more of the plurality of light controllers through the backbone double loop self healing fiber optic communications circuit, the fiber optic router, respective ones of the local double loop self healing fiber optic communications circuits, and respective ones of the main or backup concentrators.

BRIEF DESCRIPTION OF THE DRAWINGS

For a more complete understanding of the present invention and the advantages thereof, reference is now made to the following description, in conjunction with the accompanying drawings briefly described as follows.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawings, details of specific embodiments of the present invention are schematically illustrated. Like elements in the drawings will be represented by like numbers, and similar elements will be represented by like numbers with a different lower case letter suffix.

Figure 1:
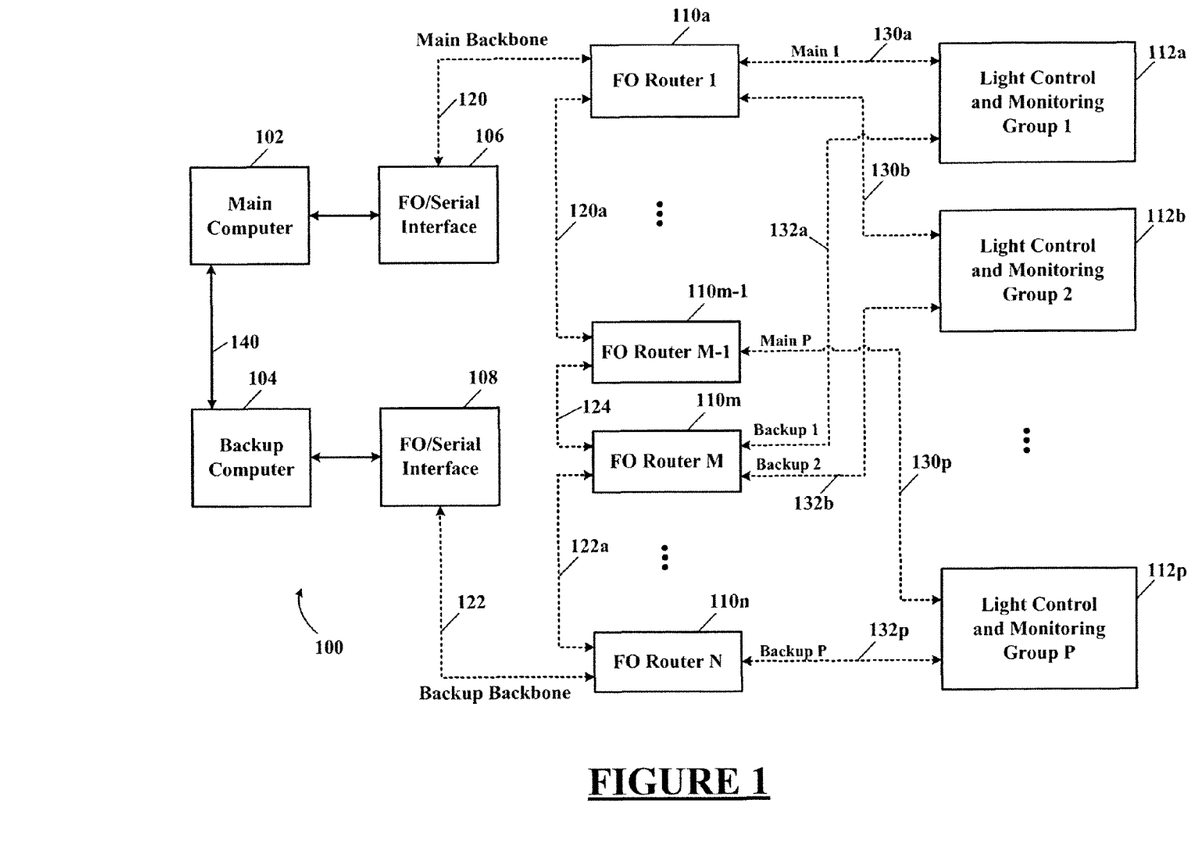
FIG. 1 illustrates a schematic block diagram of an airfield lighting control and monitoring system utilizing a backbone and a plurality of local fiber optic double loop self healing communications circuits, according to a specific example embodiment of this disclosure.

Referring to FIG. 1, depicted is a schematic block diagram of an airfield lighting control and monitoring system utilizing a backbone and a plurality of local fiber optic double loop self healing communications circuits, according to a specific example embodiment of this disclosure. The airfield lighting control and monitoring system (hereinafter "ALCMS"), generally represented by the numeral 100, comprises a main computer 102, a backup computer 104, a main backbone fiber optic to serial interface 106, a backup backbone fiber optic to serial interface 108, a plurality of fiber optic routers 110, a plurality of local light control and monitoring groups 112, a backbone fiber optic double loop self healing communications circuit (120, 122, 124); and a plurality of local fiber optic double loop self healing communications circuits (130, 132). The serial interface portions of the main and backup backbone fiber optic to serial interfaces 106 and 108 may be full duplex serial data communications such as, for example but not limited to, RS-422/485, Ethernet, USB, Firewire, etc. It is contemplated and within the scope of this disclosure that the main computer 102 and backup computer 104 may be combined into, for example but not limited to, one high reliability computer having two serial interfaces available to couple to the main backbone fiber optic to serial interface 106 and the backup backbone fiber optic to serial interface 108.

The backbone fiber optic double loop self healing communications circuit comprises main backbone loop circuits 120, backup backbone loop circuits 122, and a transition backbone loop circuit 124. The plurality of local fiber optic double loop self healing communications circuits each comprise main local loop circuits 130 and backup local loop circuits 132. These double loop self healing communications circuits are coupled together for communications therebetween by means of the plurality of fiber optic routers 110 as more fully disclosed hereinafter. Data, e.g., monitoring and control, communications may be by using serial digital time division multiplexing (TDM) of data bytes or packets as used in Ethernet communications systems and the like. Generally, data flows between the backbone double loop circuit (120, 122, 124) and each individual local double loop circuit (130, 132) so that the computers 102, 104 can monitor and issue control commands to each point (light) in the local light control and monitoring groups 112. However, it is contemplated and within the scope of this disclosure that different ones of the plurality of local light control and monitoring groups 112 may communicate with each other over their respective individual local double loop circuits (130, 132).

The plurality of fiber optic routers 110 are coupled together to function as a fiber optic hub or multiplexer that spreads or routs data between the backbone double loop circuit (120, 122, 124) and the individual local double loop circuits (130, 132). The backbone double loop circuit (120, 122, 124) comprises a duplex or half duplex fiber optic communications cable, e.g., a plurality of conductive glass or plastic fibers conducting light wavelengths, providing duplex, half duplex and/or simplex light wave communications paths between fiber optic interfaces. Each of the fiber optic routers 110 can also communicate with an adjacent fiber optic router 110, for example over fiber optic duplex communications cables 120, 120*a*, 122, 122*a* and 124. Wherein if one of the fiber optic duplex communications paths (cables 120, 120*a*, 122, 122*a* and 124) to a fiber optic router 110 should malfunction, then that fiber optic router 110 can still remain functional with the other connected fiber optic duplex communications path (cable). This fiber optic communications configuration is referred to as "double loop self healing communications" since there are two communications paths represented by the main backbone loop circuits 120, backup backbone loop circuits 122, and a transition backbone loop circuit 124 therebetween. If one of these communications circuits should fail, either the main computer 102 or the backup computer 104 can still communicate with any of the fiber optic routers 110 over either the main backbone loop circuit 120 or the backup backbone loop circuit 122, respectively. The main computer 102 and the backup computer 104 also communicate and synchronize operations over communications link 140. Thus either or both of the computers 102, 104 can control the ALCMS 100. These fiber optic communications cables (120, 122, 124, 130, 132) may be located in electrical conduit, armor sheaving, and/or direct burial cables. Each of the fiber optic routers 110 further communicates with the plurality of local light control and monitoring groups 112, as described more fully hereinbelow.

Figure 2:
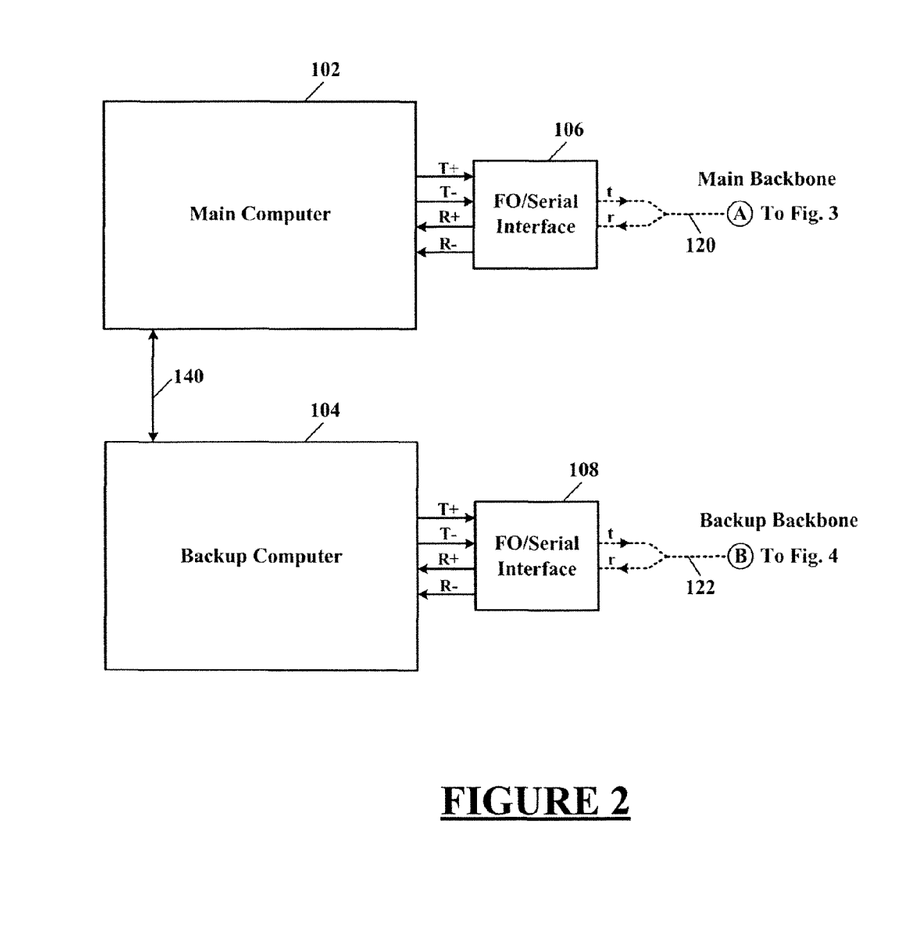
FIG. 2 illustrates a more detailed schematic block diagram of the main and backup computer portion of the airfield lighting control and monitoring system shown in FIG. 1.

Referring to FIG. 2, depicted is a more detailed schematic block diagram of the main and backup computer portion of the airfield lighting control and monitoring system shown in FIG. 1. The main computer 102 communicates with the first backbone fiber optic to serial interface 106, and the backup computer 104 communicates with the second backbone fiber optic to serial interface 108, over full duplex copper serial data communications cables such as those used with for example, but not limited to, RS-422/485, Ethernet, USB, Firewire, etc. The main and backup backbone fiber optic to serial interfaces 106 and 108 convert the electrical data signals from the main and backup computers 102 and 104, respectively, to light wave signals for transmission in the fiber optic cables comprising the main and backup fiber optic backbone circuits 120 and 122, respectively, that comprise the backbone fiber optic double loop circuit. A health, synchronization and/or failover communications link 140 may be used between the main computer 102 and the backup computer 104 for synchronization and/or automatic failover purposes during operation and/or a fault condition in either one of these computers, or upon a failure in either the main and backup fiber optic backbone circuits 120 and 122. The fiber optic to serial interfaces may be, for example but are not limited to, a Model 2140 Optical Mini Bit-Driver® (a registered trademark of S.I. Tech, P.O. Box 609, Geneva, Ill. 60134), www.sitech-bitdriver.com, incorporated by reference here for all purposes. The functions of the main and backup backbone fiber optic to serial interfaces 106 and 108 are repeating data between the fiber optic ports and to drop/insert data on the RS-422/485 port. The RS-422/485 port can insert data onto both fiber ports and drop data from both fiber ports.

Figure 3:
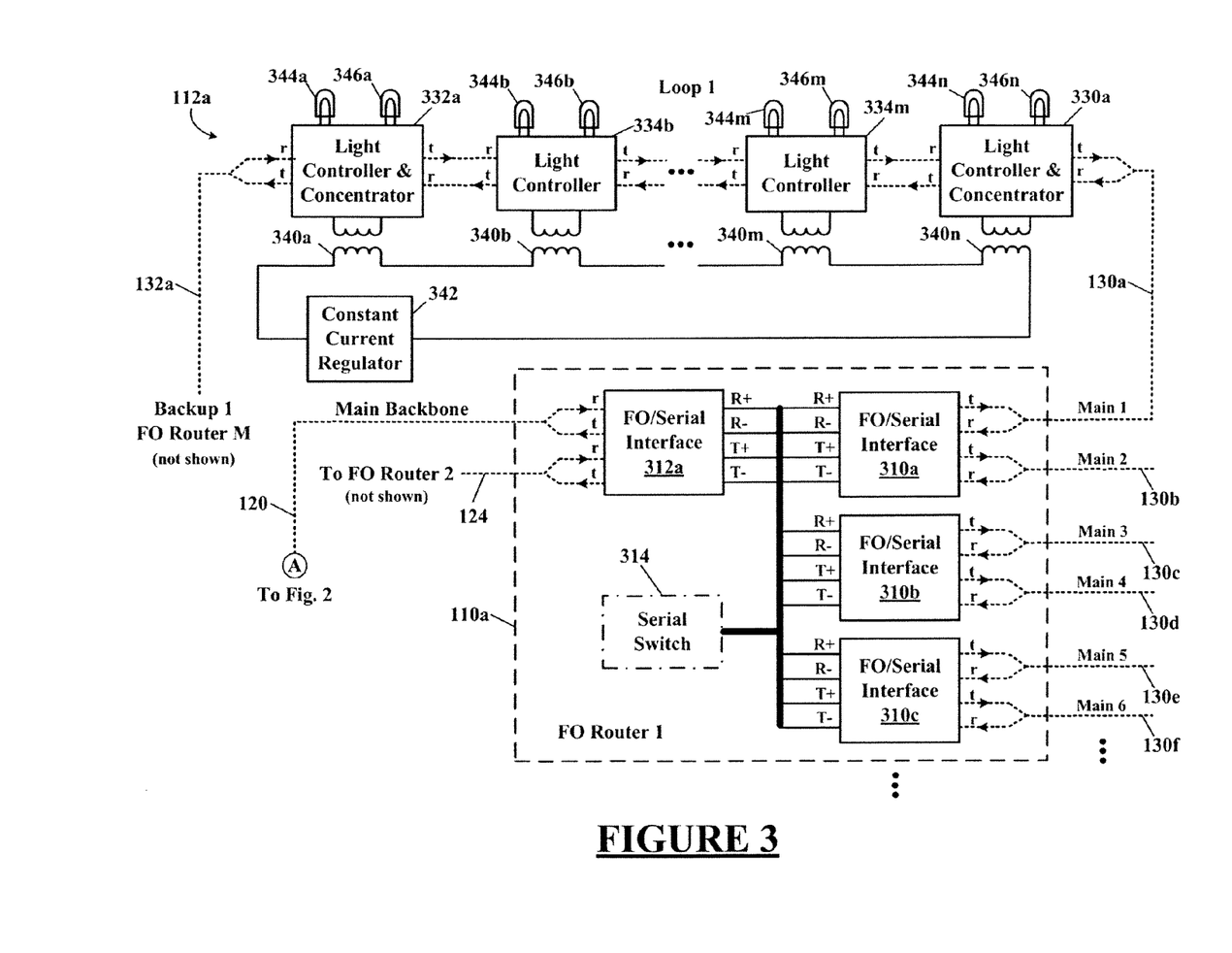
FIG. 3 illustrates a more detailed schematic block diagram of a local lamp control and monitoring group, an associated local double loop duplex fiber optic communications circuit and an associated main concentrator shown coupled to a fiber optic communications router, according to the specific example embodiment of FIG. 1.

Referring to FIG. 3, depicted is a more detailed schematic block diagram of a local lamp control and monitoring group, an associated local double loop duplex fiber optic communications circuit and an associated main concentrator shown coupled to a fiber optic communications router, according to the specific example embodiment of FIG. 1. One fiber optic router 110a of the plurality of fiber optic routers 110 is shown coupled to the main fiber optic backbone 120 (e.g., fiber optic cable). Each of the fiber optic routers 110 (110a shown as an example) comprises a fiber optic to serial interface 312 and a plurality of fiber optic to serial interfaces 310. These fiber optic to serial interfaces may be, for example but are not limited to, a Model 2140 Optical Mini Bit-Driver® (a registered trademark of S.I. Tech, P.O. Box 609, Geneva, Ill. 60134), www.sitech-bitdriver.com, incorporated by reference here for all purposes.

The purpose of the fiber optic to serial interfaces 310 and 312 are for repeating data between the fiber optic ports and to drop/insert data on the RS-422/485 ports. The RS-422/485 port can insert data onto both fiber ports and drop data from both fiber ports. The RS-422/485 ports are tied together so as to enable intercommunications between the fiber optic to serial interfaces 310 and 312, and devices connected thereto. A serial switch 314 (Ethernet router) is optionally shown if Ethernet interfaces are used in the fiber optic to serial interfaces 310 and 312 instead of RS-422/485. However, operation remains the same. The fiber optic to serial interface 312a optically couples (the RS-422/485 ports are electrically coupled together) the main backbone circuit 120 to the fiber optic router 110a.

Each of the plurality of fiber optic to serial interfaces 310 is connected to a respective one of the local light control and monitoring groups 112 with main local loop circuits 130. Shown in FIG. 3 is a representative local light control and monitoring group 112a comprising a main concentrator 330a, a backup concentrator 332a, a plurality of light controllers 334, a plurality of current transformers 340, and a constant current regulator 342. The main concentrator 330a is connected to the fiber optic to serial interface 310a of the fiber optic router 110a with a fiber optic duplex communications cable comprising the main local loop circuit 130a. The backup concentrator 332a is connected to a fiber optic to serial interface 310 of a fiber optic router 110m (FIG. 1) with a fiber optic duplex communications cable comprising the backup local loop circuit 132a.

Control and status information is optically coupled between the main concentrator 330a and the light controller 334m, and the backup concentrator 332a and the light controller 334b. Also this control and status information is optically coupled between the plurality of light controllers 334b-334m. Whereby two fiber optic communications paths are available, a main and a backup configured as a local fiber optic double loop self healing communications circuit. The fiber optic pass through communications feature of the concentrators 330a and 332a, and the plurality of light controllers 334b-334m enable redundant control and monitoring with a high level of availability and increased reliability of the airfield lighting system, according to the teachings of this disclosure. The main and backup concentrators 330 and 332 may also comprise light controllers as more fully disclose in FIG. 5 and the description therewith.

The plurality of current transformers 340 supply isolated operating power to respective ones of the plurality of light controllers 334 and concentrators 330 and 332 for operational control of and power to airfield runway lighting. Each current transformer 340 may have, for example but is not limited to, a capacity of from about 40 watts to about 600 watts of power. A constant current regulator 342 supplies power at a constant current to the current transformers 340. A value for this constant current may be selectable, e.g., from about 2.8 amperes to about 6.6 amperes RMS. A plurality of airfield runway lights 344 and 346 are controlled by respective ones of the light controllers 334. The main and backup concentrators 330 and 332 may also include light control circuits like in the light controllers 334, and therefore may also control some of the airfield runway lights 344 and 346. It is contemplated and within the scope of this disclosure that the same hardware may be used for both the light controllers 334 and the concentrators 330 and 332, with differentiation made therebetween by software (firmware) programming.

Figure 4:
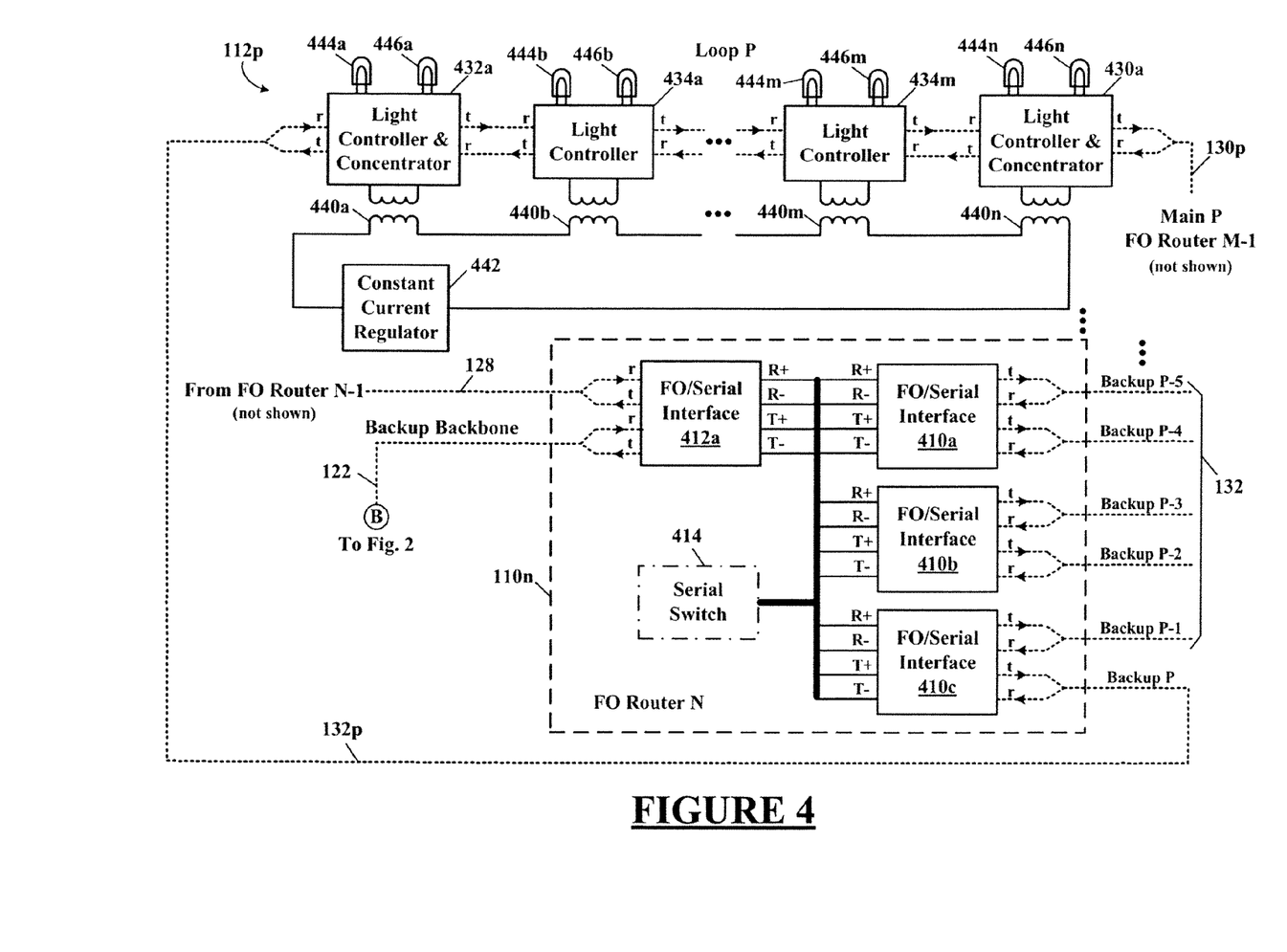
FIG. 4 illustrates a more detailed schematic block diagram of another local lamp control and monitoring group, an associated local double loop duplex fiber optic communications circuit and an associated backup concentrator coupled to a fiber optic communications router, according to the specific example embodiment of FIG. 1.

Referring to FIG. 4, depicted is a more detailed schematic block diagram of another local lamp control and monitoring group, an associated local double loop duplex fiber optic communications circuit and an associated backup concentrator coupled to a fiber optic communications router, according to the specific example embodiment of FIG. 1. One fiber optic router 110n of the plurality of fiber optic routers 110 is shown coupled to the backup fiber optic backbone 122 (e.g., fiber optic cable). Each of the fiber optic routers 110 (110n shown as an example) comprises a fiber optic to serial interface 412 and a plurality of fiber optic to serial interfaces 410. These fiber optic to serial interfaces may be, for example but are not limited to, a Model 2140 Optical Mini Bit-Driver® (a registered trademark of S.I. Tech, P.O. Box 609, Geneva, Ill. 60134), www.sitech-bitdriver.com, incorporated by reference here for all purposes.

The purpose of the fiber optic to serial interfaces 410 and 412 are for repeating data between the fiber optic ports and to drop/insert data on the RS-422/485 ports. The RS-422/485 port can insert data onto both fiber ports and drop data from both fiber ports. The RS-422/485 ports are tied together so as to enable intercommunications between the fiber optic to serial interfaces 410 and 412, and devices connected thereto. A serial switch 414 (Ethernet router) is optionally shown if Ethernet interfaces are used in the fiber optic to serial interfaces 410 and 412 instead of RS-422/485. However, operation remains the same. The fiber optic to serial interface 412a optically couples (the RS-422/485 ports are electrically coupled together) the backup backbone circuit 122 to the fiber optic router 110n.

Each of the plurality of fiber optic to serial interfaces 410 is connected to a respective one of the local light control and monitoring groups 112 with backup local loop circuits 132. Shown in FIG. 4 is a representative local light control and monitoring group 112p comprising a main concentrator 430a, a backup concentrator 432a, a plurality of light controllers 434, a plurality of current transformers 440, and a constant current regulator 442. The backup concentrator 432a is connected to fiber optic to serial interface 410c of the fiber optic router 110n with a fiber optic duplex communications cable comprising the backup local loop circuit 132p. The main concentrator 430a is connected to the fiber optic to serial interface 310c of a fiber optic router 110m-1 (FIG. 1) with the fiber optic duplex communications cable comprising the main local loop circuit 130p.

Control and status information is optically coupled between the backup concentrator 432a and the light controller 434b, and the main concentrator 430a and the light controller 434*m*. Also this control and status information is optically coupled between the plurality of light controllers 434*b*-434*m*. Whereby two fiber optic communications paths are available, a main and a backup configured as a local fiber optic double loop self healing communications circuit. The fiber optic pass through communications feature of the concentrators 430*a* and 432*a*, and the plurality of light controller 434*b*-434*m* enable redundant control and monitoring with a high level of availability and increased reliability of the airfield lighting system, according to the teachings of this disclosure. The main and backup concentrators 430 and 432 may also comprise light controllers as more fully disclose in FIG. 5 and the description therewith.

The plurality of current transformers 440 supply isolated operating power to respective ones of the plurality of light controllers 434 and concentrators 430 and 432 for operational control of and power to airfield runway lighting. Each current transformer 440 may have, for example but is not limited to, a capacity of from about 40 watts to about 600 watts of power. A constant current regulator 442 supplies power at a constant current to the current transformers 440. A value for this constant current may be selectable, e.g., from about 2.8 amperes to about 6.6 amperes RMS. A plurality of airfield runway lights 444 and 446 are controlled by respective ones of the light controllers 434. The main and backup concentrators 430 and 432 may also include light control circuits like in the light controllers 434, and therefore may also control some of the airfield runway lights 444 and 446. It is contemplated and within the scope of this disclosure that the same hardware may be used for both the light controllers 434 and the concentrators 430 and 432, with differentiation made therebetween by software (firmware) programming.

Figure 5:
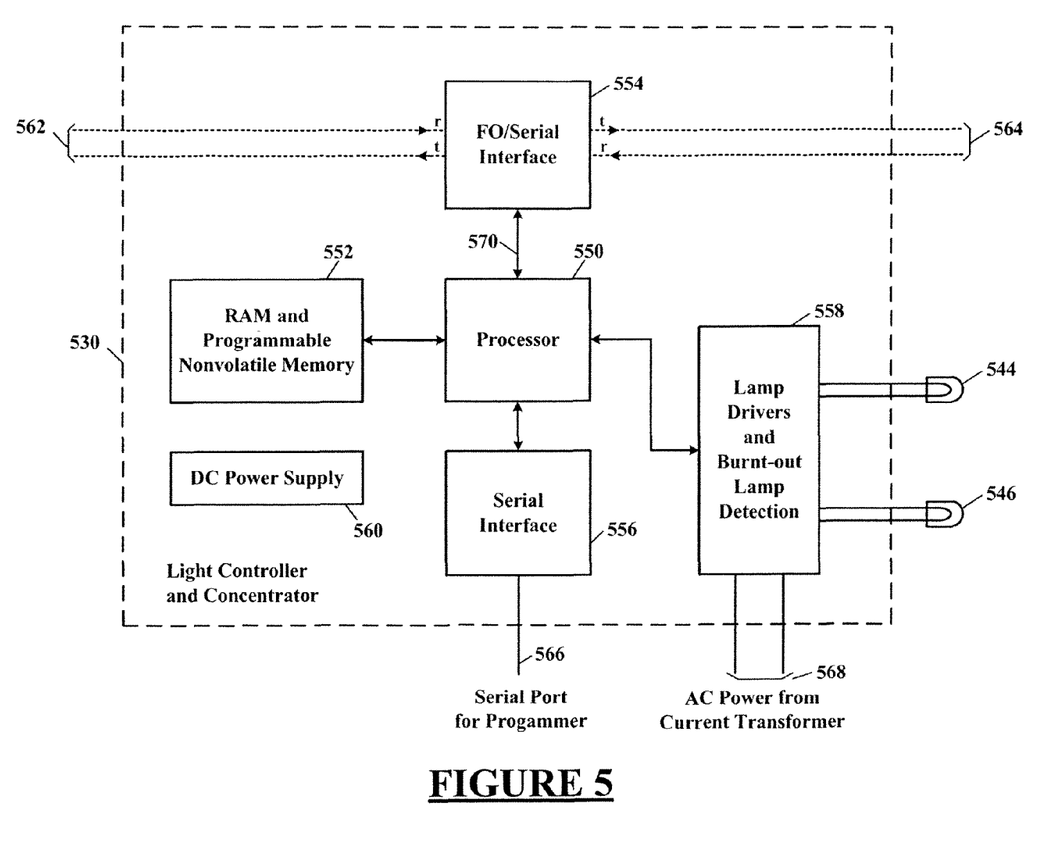
FIG. 5 illustrates a schematic block diagram of a light controller/concentrator of the airfield lighting control and monitoring system shown in FIG. 1, according to a specific example embodiment of this disclosure.

Referring to FIG. 5, depicted is a schematic block diagram of a light controller/concentrator of the airfield lighting control and monitoring system shown in FIG. 1, according to a specific example embodiment of this disclosure. A fiber optic light controller and concentrator 530 comprises a digital processor 550, random access memory (RAM) and programmable nonvolatile memory 552, a fiber optic to serial interface 554, a serial interface 556, lamp drivers and burnt-out lamp detection circuits 558, and a direct current (DC) power supply 560. The fiber optic light controller and concentrator 530 may also be configured as a fiber optic light controller (e.g., controllers 334 and 434) by a simple firmware change that disables the concentrator functions thereof. This facilitates reducing the different types of products manufactured and the number of spares required at an airfield installation. A simple field programming change may configure the fiber optic light controller and concentrator 530 for lamp control only, or lamp control and data concentration.

General operation of the fiber optic light controller and concentrator 530 may be, for example but is not limited to, control of one or two lamps, e.g., lamps 544 and 546, with the controller and concentrator 530 located between the lamp(s) 544 and 546, and a secondary (power circuit 568) of a respective one of the current transformers 340 or 440. The controller and concentrator 530 has the capabilities of operating different light fixtures and/or functions. For example, but not limited to, failed lamp location (FLL), in-pavement runway guard lights (IRGL), elevated runway guard lights (ERGL), stop bar, dual lamps, center line lamps, sensors (e.g., intrusion, temperature, water/ice, etc.), switching and command, e.g., burnt out lamp (BOL) detection, lamp status, flashing of lamps, etc. The lamps may be switched on and off with mechanical or solid state relays, and the lamps may be flashed on and off using solid state relays or other devices, e.g., a triac. A burnt out lamp may be shorted out of the series connected circuit with a relay (not shown) so that the other or backup lamp may still operate. Control commands, operational profiles and status may be stored in the data concentrator portion of the controller and concentrator 530. Lamp activation and monitoring may be available from an airfield control tower, power control vault and/or maintenance room (not shown).

The digital processor 550 is coupled to a serial programming port 566 with the serial interface 556. A programmer (not shown) may be coupled to the serial interface and then used to program the fiber optic light controller and concentrator 530 to function as either a controller and concentrator, or just a controller as required. The desired programming configuration(s) may be stored in the nonvolatile portion of the memories 552 along with the operation program that controls the processor 550. The processor 550 controls operation of the lamp drivers and may receive lamp status from the lamp drivers and burnt-out lamp detection 558, as disclosed more fully hereinabove. The processor 550 also communicates with the fiber optic to serial interface 554 during normal operation of the fiber optic light controller and concentrator 530.

The fiber optic to serial interface 554 has an upstream optical data port 562 and a downstream optical data port 564. Optically encoded digital information can pass (e.g., exchanged) between these two optical data port 562 and 564. An electronic communications bus 570 is coupled to the processor 550 so that the processor 550 can retrieve information from and/or inject information into either one or both of the optical data ports 562 and 564. The processor 550 may thereby communicate with a respective fiber optic router 110 and/or an adjacent main or backup concentrators 330, 332 or 430, 432. The fiber optic to serial interface 554 has two possible data paths that may be used concurrently or independently with the processor 550, and affords communications redundancy with the main computer 102 and/or backup computer 104. Also, control to and status information from the main or backup concentrator 330, 332 or 430, 432 may be stored (e.g., concentrated) in either one or both of the main (330 or 430) and/or backup (332 or 432) concentrators associated with the group 112 (FIG. 1). This feature of the invention enables faster parallel/redundant operation of both control and status retrieval since each group 112 may operate independently of another. Concentration of information provided by the main and/or backup concentrators further improves response time speeds because bursts of accumulated historical information may be retrieved at one time instead of just receiving bits of information on a piece meal basis. Exception status reporting may further improve throughput and response times. A plurality of control commands for different ones of the main and/or backup concentrators, e.g., 330, 332, of a group 112 may be sent to an appropriate one or both concentrators of that group 112 for subsequent independent distribution to the appropriate light controllers, e.g., 334, of that group 112.

Although specific example embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

We claim:

1. An airfield lighting control and monitoring system, said system comprising:
    a main computer;
    a backup computer;
    a main backbone fiber optic to serial interface, wherein a serial interface portion thereof is coupled to the main computer;
    a backup backbone fiber optic to serial interface, wherein a serial interface portion thereof is coupled to the backup computer;
    a first fiber optic router having a plurality of fiber optic transmit and receive port pairs;
    a backbone double loop self healing fiber optic communications circuit having a main backbone fiber optic portion and a backup backbone fiber optic portion, wherein
        a first end of the main backbone fiber optic portion is coupled to a fiber optic transmit and receive port pair of the main backbone fiber optic to serial interface,
        a second end of the main backbone fiber optic portion is coupled to one of the plurality of fiber optic transmit and receive port pairs of the first fiber optic router,
        a first end of the backup backbone fiber optic portion is coupled to a fiber optic transmit and receive port pair of the backup backbone fiber optic to serial interface, and
        a second end of the backup backbone fiber optic portion is coupled to one of a plurality of fiber optic transmit and receive port pairs of a second fiber optic router;
    a plurality of local light control and monitoring groups, each of the plurality of local light control and monitoring groups comprises:
        a main concentrator having first and second fiber optic transmit and receive port pairs,
        a backup concentrator having first and second fiber optic transmit and receive port pairs,
        a plurality of light controllers having first and second fiber optic transmit and receive port pairs, wherein the plurality of light controllers are fiber optically coupled together, the first one of the plurality of light controllers is fiber optically coupled to the main concentrator, and the last one of the plurality of light controllers is fiber optically coupled to the backup concentrator; and
        a local double loop self healing fiber optic communications circuit having a main local fiber optic portion and a backup local fiber optic portion, wherein
            a first end of the main local fiber optic portion is coupled to a fiber optic transmit and receive port pair of the main concentrator,
            a second end of the main local fiber optic portion is coupled to a respective one of the plurality of fiber optic transmit and receive port pairs of the first fiber optic router,
            a first end of the backup local fiber optic portion is coupled to a fiber optic transmit and receive port pair of the backup concentrator, and
            a second end of the backup local fiber optic portion is coupled to another respective one of the plurality of fiber optic transmit and receive port pairs of the second fiber optic router;
    wherein the main and backup computers can communicate with any one or more of the plurality of light controllers through the backbone double loop self healing fiber optic communications circuit, the first fiber optic router, the second fiber optic router, respective ones of the local double loop self healing fiber optic communications circuits, and respective ones of the main or backup concentrators.

2. The airfield lighting control and monitoring system according to claim 1, wherein the first fiber optic router comprises:
    a plurality of fiber optic to serial interfaces, each of the plurality of fiber optic to serial interfaces having first and second transmit and receive fiber optic port pairs and a transmit and receive serial port pair;
        wherein the transmit and receive serial port pairs thereof are coupled together such that digital information can be transferred between any two or more of the transmit and receive serial port pairs,
        digital information can be transferred between the first and the second transmit and receive fiber optic port pairs, and
        digital information can be transferred between the transmit and receive serial port pair and the first or the second transmit and receive fiber optic port pairs;
    the first or second transmit and receive fiber optic port pairs of one of the plurality of fiber optic to serial interfaces of the first fiber optic router is coupled to the second end of the main backbone fiber optic portion of the backbone double loop self healing fiber optic communications circuit; and
    each of the second ends of the main local fiber optic portions of the local double loop self healing fiber optic communications circuits is coupled to the first or second fiber optic port pairs of a respective one of the plurality of fiber optic to serial interfaces of the first fiber optic router.

3. The airfield lighting control and monitoring system according to claim 2, wherein the fiber optic router comprises a plurality of fiber optic routers, wherein each of the plurality of fiber optic routers comprises a portion of the plurality of fiber optic to serial interfaces.

4. The airfield lighting control and monitoring system according to claim 1, wherein the serial interface portions of the first and second backbone fiber optic to serial interfaces are RS-422/485 compatible.

5. The airfield lighting control and monitoring system according to claim 2, wherein the transmit and receive serial port pairs of the plurality of fiber optic to serial interfaces are RS-422/485 compatible.

6. The airfield lighting control and monitoring system according to claim 1, wherein the serial interface portions of the first and second backbone fiber optic to serial interfaces are selected from the group consisting of Ethernet, USB and Firewire compatible interfaces.

7. The airfield lighting control and monitoring system according to claim 1, wherein each of the plurality of local light controllers controls at least one airfield light.

8. The airfield lighting control and monitoring system according to claim 1, further comprising each of the main and backup concentrators controls at least one airfield light.

9. The airfield lighting control and monitoring system according to claim 7, wherein the at least one airfield light is selected from the group consisting of in-pavement runway guard light (IRGL), elevated runway guard light (ERGL), stop bar light, and center line lights.

10. The airfield lighting control and monitoring system according to claim 2, further comprising a serial switch for coupling together the transmit and receive serial port pairs of the plurality of fiber optic to serial interfaces.

11. The airfield lighting control and monitoring system according to claim 1, wherein each of the main and backup concentrators, and the plurality of light controllers comprise:
a digital processor;
random access memory coupled to the digital processor;
programmable nonvolatile memory coupled to the digital processor;
first and second fiber optic transmit and receive port pairs to a transmit and receive serial port pair coupled to the digital processor;
a programming and maintenance serial interface port coupled to the digital processor;
lamp drivers;
burnt-out lamp detection; and
a power supply.

12. The airfield lighting control and monitoring system according to claim 11, wherein the main and backup concentrators further comprise a program for storing and forwarding status information from and commands to the plurality of light controllers.

13. The airfield lighting control and monitoring system according to claim 11, wherein the first and second fiber optic transmit and receive port pairs can transfer digital information therebetween, and to and from the transmit and receive serial port pair.

14. The airfield lighting control and monitoring system according to claim 1, wherein the main and backup computers comprise one computer having main and backup serial interfaces.

15. A local light control and monitoring group, comprising:
a main concentrator having first and second fiber optic transmit and receive port pairs,
a backup concentrator having first and second fiber optic transmit and receive port pairs,
a plurality of light controllers having first and second fiber optic transmit and receive port pairs, wherein the plurality of light controllers are fiber optically coupled together, the first one of the plurality of light controllers is fiber optically coupled to the main concentrator, and the last one of the plurality of light controllers is fiber optically coupled to the backup concentrator; and
a local double loop self healing fiber optic communications circuit having a main local fiber optic portion and a backup local fiber optic portion, wherein
a first end of the main local fiber optic portion is coupled to a fiber optic transmit and receive port pair of the main concentrator,
a second end of the main local fiber optic portion is coupled to a first fiber optic router,
a first end of the backup local fiber optic portion is coupled to a fiber optic transmit and receive port pair of the backup concentrator, and
a second end of the backup local fiber optic portion is coupled to a second fiber optic router;
wherein any one or more of the plurality of light controllers, and main and backup concentrators are accessible from the main or backup local fiber optic portions of the local double loop self healing fiber optic communications circuit.

16. The local light control and monitoring group according to claim 15, wherein each of the main and backup concentrators, and the plurality of light controllers comprise:
a digital processor;
random access memory coupled to the digital processor;
programmable nonvolatile memory coupled to the digital processor;
first and second fiber optic transmit and receive port pairs to a transmit and receive serial port pair coupled to the digital processor;
a programming and maintenance serial interface port coupled to the digital processor;
lamp drivers;
burnt-out lamp detection; and
a power supply.

17. A method for control and monitoring of an airfield lighting system, said method comprising the steps of:
providing at least one computer having main and backup fiber optic transmit and receive port pairs;
providing a first fiber optic router having a plurality of fiber optic transmit and receive port pairs;
providing a backbone double loop self healing fiber optic communications circuit having a main backbone fiber optic portion and a backup backbone fiber optic portion, wherein the backbone double loop self healing fiber optic communications circuit comprises the steps of:
coupling a first end of the main backbone fiber optic portion to a fiber optic transmit and receive port pair of the main backbone fiber optic to serial interface,
coupling a second end of the main backbone fiber optic portion to one of the plurality of fiber optic transmit and receive port pairs of a first fiber optic router,
coupling a first end of the backup backbone fiber optic portion to a fiber optic transmit and receive port pair of the backup backbone fiber optic to serial interface, and
coupling a second end of the backup backbone fiber optic portion to one of a plurality of fiber optic transmit and receive port pairs of a second fiber optic router;
providing a plurality of local light control and monitoring groups, each of the plurality of local light control and monitoring groups comprises:
a main concentrator having first and second fiber optic transmit and receive port pairs,
a backup concentrator having first and second fiber optic transmit and receive port pairs,
a plurality of light controllers having first and second fiber optic transmit and receive port pairs, wherein the plurality of light controllers are fiber optically coupled together, the first one of the plurality of light controllers is fiber optically coupled to the main concentrator, and the last one of the plurality of light controllers is fiber optically coupled to the backup concentrator; and
a local double loop self healing fiber optic communications circuit having a main local fiber optic portion and a backup local fiber optic portion, wherein the local double loop self healing fiber optic communications circuit comprises the steps of:
coupling a first end of the main local fiber optic portion to a fiber optic transmit and receive port pair of the main concentrator,
coupling a second end of the main local fiber optic portion to a respective one of the plurality of fiber optic transmit and receive port pairs of the first fiber optic router,
coupling a first end of the backup local fiber optic portion to a fiber optic transmit and receive port pair of the backup concentrator, and
coupling a second end of the backup local fiber optic portion to another respective one of the plurality of fiber optic transmit and receive port pairs of the second fiber optic router; and communicating with the at least one computer to any one or more of the plurality of light controllers through the backbone double loop self healing fiber optic communications circuit, the first fiber optic router, the second fiber optic router, respective ones of the local double loop self healing fiber optic communications circuits, and respective ones of the main or backup concentrators.

* * * * *